United States Patent
Sung et al.

(10) Patent No.: US 10,538,648 B2
(45) Date of Patent: Jan. 21, 2020

(54) RUBBER COMPOSITION CONTAINING MAIN-CHAIN BENZOXAZINE, AND PREPARATION METHOD THEREFOR

(71) Applicant: KOLON INDUSTRIES, INC., Gwacheon-si, Gyeonggi-do (KR)

(72) Inventors: Do Kyung Sung, Yongin-si (KR); Ki Hyun Park, Yongin-si (KR)

(73) Assignee: KOLON INDUSTRIES, INC., Seoul (KR)

(*) Notice: Subject to any disclaimer, the term of this patent is extended or adjusted under 35 U.S.C. 154(b) by 101 days.

(21) Appl. No.: 15/736,432

(22) PCT Filed: Jun. 16, 2016

(86) PCT No.: PCT/KR2016/006417
§ 371 (c)(1),
(2) Date: Dec. 14, 2017

(87) PCT Pub. No.: WO2016/204540
PCT Pub. Date: Dec. 22, 2016

(65) Prior Publication Data
US 2018/0186976 A1     Jul. 5, 2018

(30) Foreign Application Priority Data
Jun. 16, 2015   (KR) .................. 10-2015-0085060

(51) Int. Cl.
*C08L 9/06*     (2006.01)
*C08L 79/04*    (2006.01)
*C08G 73/06*    (2006.01)

(52) U.S. Cl.
CPC ............... *C08L 9/06* (2013.01); *C08G 73/06* (2013.01); *C08L 79/04* (2013.01)

(58) Field of Classification Search
CPC ...................................................... C08L 79/04
See application file for complete search history.

(56) References Cited

U.S. PATENT DOCUMENTS

2009/0054614 A1* 2/2009 Eguchi ............... C08G 14/06
                                                     528/162
2011/0288260 A1    11/2011 Ishida et al.

FOREIGN PATENT DOCUMENTS

| JP | 2002-302486 A | 10/2002 |
| JP | 2003-090376 A | 3/2003 |
| JP | 2007-211088 A | 8/2007 |
| JP | 2009-270016 A | 11/2009 |
| KR | 10-2014-0086108 A | 7/2014 |
| KR | 10-2015-0017491 A | 2/2015 |
| KR | 10-2015-0065751 A | 6/2015 |

OTHER PUBLICATIONS

Jia Liu et al., "Copolymers based on telechelic benzoxazine with a reactive main-chain and anhydride: monomer and polymer synthesis, and thermal and mechanical properties of carbon fiber composites", RSC Advances, pp. 16785-16791 (8 pages), Jan. 22, 2015.
Jia Liu et al., "Main-Chain Type Benzoxazine Oligomers: A New Concept for Easy Processable High Performance Polybenzoxazines", Handbook of Benzoxazine Resins, Chapter 18, 11 pages, Jan. 2011.
International Search Report for PCT/KR2016/006417 dated Oct. 25, 2016 [PCT/ISA/210].

* cited by examiner

*Primary Examiner* — Vickey Nerangis
(74) *Attorney, Agent, or Firm* — Sughrue Mion, PLLC

(57) ABSTRACT

Disclosed is a rubber composition containing main-chain benzoxazine, in which benzoxazine generates no harmful materials during vulcanization and can thus be used in lieu of a phenol novolac resin used as a resin component of a conventional rubber composition, and also in which the use of benzoxazine, especially main-chain benzoxazine having a high molecular weight, is capable of maintaining excellent mechanical properties and exhibiting high flexibility. The rubber composition of the invention can be utilized for a rubber product, especially a tire product.

13 Claims, 2 Drawing Sheets

RUBBER COMPOSITION CONTAINING MAIN-CHAIN BENZOXAZINE, AND PREPARATION METHOD THEREFOR

CROSS REFERENCE TO RELATED APPLICATIONS

This application is a National Stage of International Application No. PCT/KR2016/006417 filed Jun. 16, 2016, claiming priority based on Korean Patent Application No. 10-2015-0085060 filed Jun. 16, 2015, the contents of all of which are incorporated herein by reference in their entirety.

TECHNICAL FIELD

The present invention relates to a rubber composition containing main-chain benzoxazine and a method of preparing the same.

BACKGROUND ART

Conventionally, thermosetting resins such as phenol resin, melamine resin, epoxy resin, unsaturated polyester resin and bismaleimide resin are realized based on thermosetting properties, are excellent in water resistance, chemical resistance, heat resistance, mechanical strength and reliability, and are thus widely used across a wide range of industries.

However, phenol resin and melamine resin are disadvantageous in that volatile byproducts are generated at the time of curing, epoxy resin and unsaturated polyester resin are poor in flame retardancy, and bismaleimide resin is very expensive.

With the goal of solving the above problems, there has been studied polybenzoxazine in which a benzoxazine ring is subjected to a ring-opening polymerization reaction so as to undergo thermal curing without the generation of volatile matter as noted above.

The thermosetting resin having a benzoxazine ring in the molecular structure is a resin in which an oxazine ring is ring-opened by heating and polymerization proceeds without the generation of byproducts, and is thus receiving attention as a thermosetting resin for use in an encapsulating material, impregnation, a laminate, an adhesive, paint, a coating material, a friction material, FRP and a molding material. The benzoxazine ring has a structure that is a combination of a benzene ring and an oxazine ring.

Benzoxazine, having a high glass transition temperature (Tg), low dielectric properties, high tension, a low coefficient of thermal expansion, superb flexibility, and low hygroscopicity, is a curable polymer in which mechanical properties, electrical properties and chemical properties are well balanced.

Techniques for further improving the properties of benzoxazine are being continuously developed. For example, Korean Patent Application Publication No. 10-2012-0058566 discloses a polybenzoxazine composition, in which polybenzoxazine having good thermal stability is prepared by polymerizing a curable composition comprising a benzoxazine compound and a pentafluoroantimonic acid catalyst through heating under conditions of sufficient temperature and time.

Meanwhile, phenol novolac and hexamine have been used as the kinds of resin in conventional rubber compositions. However, the phenol novolac resin suffers from emission of harmful materials such as amine, gas such as formalin, etc. at the time of curing.

Therefore, the present inventors have ascertained that when benzoxazine, having no material generated upon curing compared to resins used for conventional rubber compositions, is utilized as a resin for a rubber composition, superior mechanical properties may be exhibited compared to existing resins, which culminates in the present invention.

DISCLOSURE

Technical Problem

Accordingly, the present invention is intended to provide a rubber composition which contains main-chain benzoxazine having a high molecular weight and generates no harmful material upon resin curing compared to conventional rubber compositions including phenol novolac resin, and also to provide a method of preparing the same.

Technical Solution

A preferred first embodiment of the present invention provides a rubber composition, containing main-chain benzoxazine comprising a polymer main chain having an oxazine ring.

In this embodiment, the main-chain benzoxazine may have a weight average molecular weight ranging from 500 g/mol to 8000 g/mol.

In this embodiment, the main-chain benzoxazine may be represented by Chemical Formula 1 or 2 below:

<Chemical Formula 1>

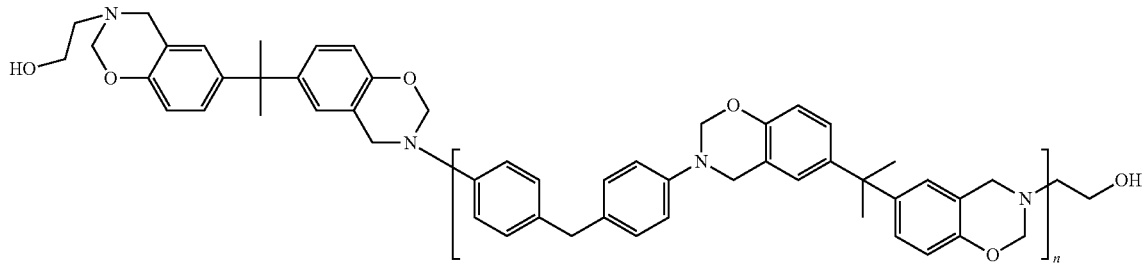

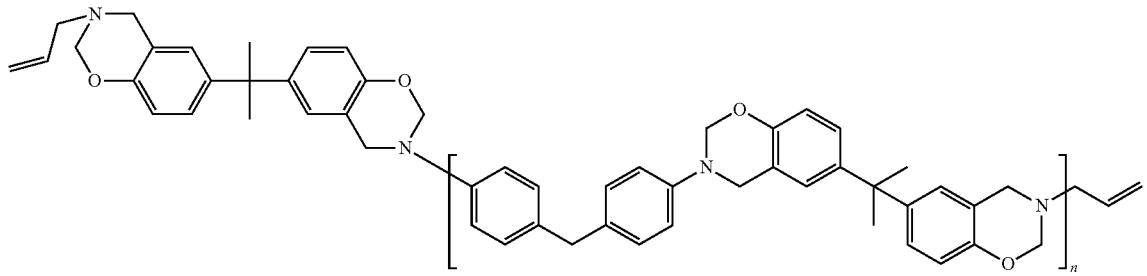

<Chemical Formula 2> in Chemical Formula 1, n=1~10 and in Chemical Formula 2, n=1~10.

In this embodiment, the main-chain benzoxazine may be prepared by reacting a diphenol-based compound, an amine-based compound, and an aldehyde-based compound.

In this embodiment, the diphenol-based compound may be at least one selected from the group consisting of bisphenol A (2,2-bis(4-hydroxyphenyl)propane, BPA), bisphenol AP (1,1-bis(4-hydroxyphenyl)-1-phenyl-ethane), bisphenol AF (2,2-bis(4-hydroxyphenyl)hexafluoropropane), bisphenol B (2,2-bis(4-hydroxyphenyl)butane), bisphenol BP (bis-(4-hydroxyphenyl)diphenylmethane), bisphenol C (2,2-bis(3-methyl-4-hydroxyphenyl)propane), (bis(4-hydroxyphenyl)-2,2-dichloroethylene), bisphenol E (1,1-bis(4-hydroxyphenyl)ethane), bisphenol F (bis(4-hydroxyphenyl)methane), bisphenol G (2,2-bis(4-hydroxy-3-isopropyl-phenyl)propane), bisphenol M (1,3-bis(2-(4-hydroxyphenyl)-2-propyl)benzene), bisphenol S (bis(4-hydroxyphenyl)sulfone), bisphenol P (1,4-bis(2-(4-hydroxyphenyl)-2-propyl)benzene), bisphenol PH (5,5'-(1-methylethyliden)-bis[1,1'-(bisphenyl)-2-ol]propane), bisphenol TMC (1,1-bis(4-hydroyphenyl)-3,3,5-trimethyl-cyclohexane), and bisphenol Z (1,1-bis(4-hydroxyphenyl)-cyclohexane).

In this embodiment, the amine-based compound may be selected from among monoamine and diamine.

Specific examples of the monoamine may include ethanolamine, allylamine, methylamine, ethylamine, propylamine, butylamine, isopropylamine, hexylamine, octadecylamine, cyclohexylamine, 2-aminofluorene and aniline. Preferably, allylamine and ethanolamine are used in terms of reactivity and production feasibility.

The diamine-based compound may be at least one selected from the group consisting of diamino diphenyl methane, o-phenylene diamine, m-phenylene diamine, p-phenylene diamine, benzidine, furfurylamine, 1,4-diaminobenzene, 2-aminobenzylamine, 4,4'-methylenedianiline, 4,4'-diaminodiphenylether, 4,4'-diaminodiphenylsulfone, 4,4'-diaminophenylsulfide and 4,4'-oxydianiline; alicyclic diamine, including 1,4-diaminocyclohexane; and 1,2-diaminoethane, 1,3-diaminopropane, 1,4-diaminobutane, 1,6-diaminohexane, 1,10-diaminodecane, 1,12-diaminododecane, 1,14-diaminotetradecane and 1,18-diaminooctadecane.

In this embodiment, the aldehyde-based compound may be at least one selected from the group consisting of paraformaldehyde, formaldehyde, acetaldehyde, propionaldehyde, butylaldehyde, and polyoxymethylene.

In this embodiment, the main-chain benzoxazine may be contained in an amount of 1 to 30 parts by weight based on 100 parts by weight of raw rubber.

The raw rubber may comprise 100 parts by weight of styrene-butadiene rubber and 10 to 60 parts by weight of natural rubber.

In this embodiment, the rubber composition may include zinc oxide, stearic acid, carbon black, processing oil, sulfur, and N-tert-butylbenzothiazole-2-sulfenamide (TBBS).

In this embodiment, the rubber composition may include, based on 100 parts by weight of the raw rubber, 1~10 parts by weight of zinc oxide, 0.5~5 parts by weight of stearic acid, 30~75 parts by weight of carbon black, 2~10 parts by weight of processing oil, 0.5~25 parts by weight of sulfur, and 0.2~10 parts by weight of N-tert-butylbenzothiazole-2-sulfenamide (TBBS).

Advantageous Effects

According to the present invention, a rubber composition contains main-chain benzoxazine, and thus generates no byproducts upon vulcanization, compared to when using conventional phenol novolac resin.

Also, when the main-chain benzoxazine is contained in the rubber composition, desired mechanical properties can be realized after curing. The main-chain benzoxazine having a molecular weight of 500 to 10,000 is contained in the rubber composition, thereby attaining superior mechanical properties after curing.

The rubber composition containing main-chain benzoxazine according to the present invention can retain superior mechanical properties and can also exhibit high flexibility, and can thus be utilized as a reinforcing resin upon production of rubber products. Therefore, the rubber composition of the present invention can be employed as a material for tire products.

BEST MODE

Figure 1:
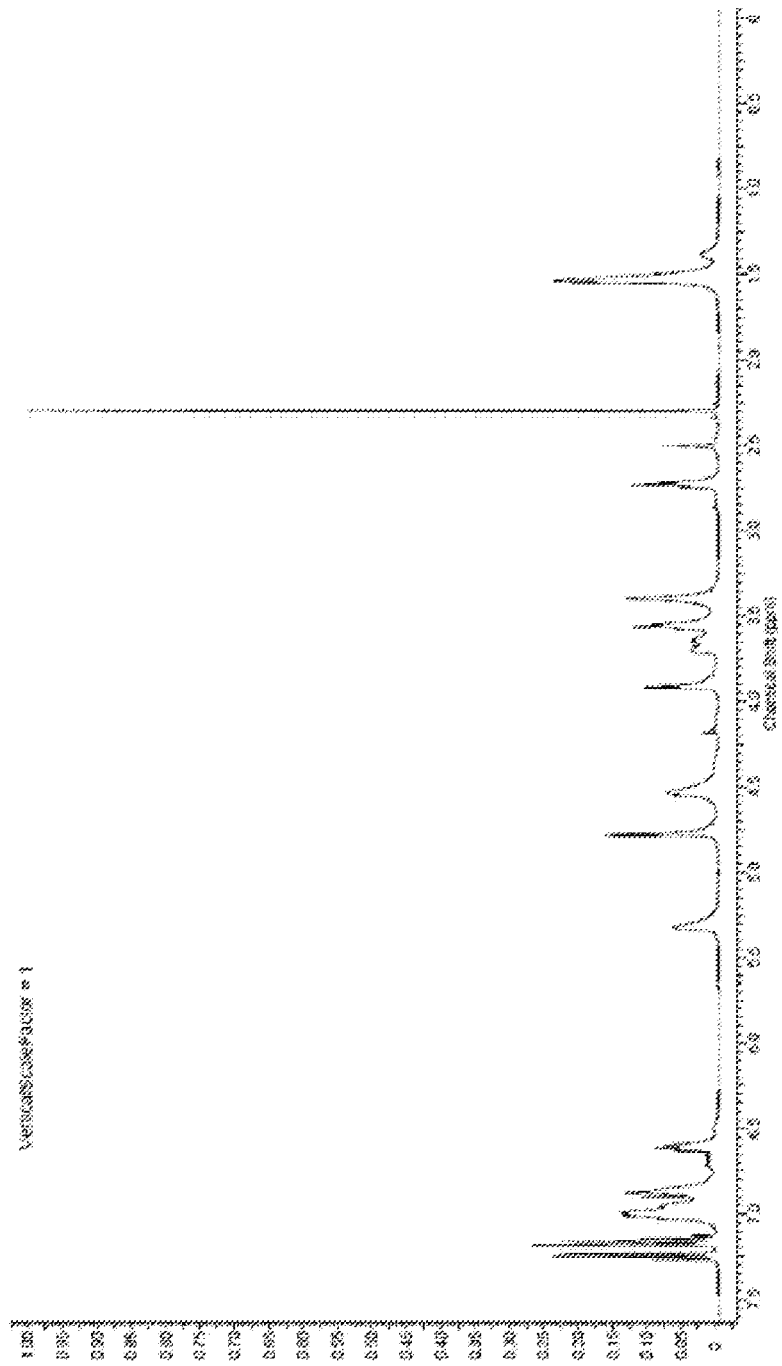
FIG. 1 shows the NMR spectrum of Chemical Formula 1, which is the main-chain benzoxazine of the present invention.

Hereinafter, a detailed description will be given of the present invention.

The present invention addresses a rubber composition, containing main-chain benzoxazine comprising a polymer main chain having an oxazine ring.

According to the present invention, the rubber composition may exhibit improved mechanical properties through curing of the main-chain benzoxazine thereof.

Herein, the main-chain benzoxazine has a weight average molecular weight of 500 to 10,000 g/mol, and preferably 3,000 to 10,000 g/mol. If the weight average molecular weight of the main-chain benzoxazine is less than 500 g/mol, curing density may be insufficient upon rubber vulcanization due to low reactivity, undesirably deteriorating mechanical properties. On the other hand, if the weight average molecular weight thereof exceeds 10,000 g/mol, the molecular weight cannot be adjusted upon production or ejection may become impossible due to the excessively high viscosity.

The curing of the main-chain benzoxazine having high molecular weight may result in high curing density, thereby enhancing mechanical properties. When the main-chain benzoxazine is cured in the rubber compound, hardness and mechanical properties may be improved, whereby the rubber composition of the invention may function as a reinforcing resin.

The rubber composition of the present invention, having high reinforcing properties, may be utilized in a tire rubber composition.

The main-chain benzoxazine is not limited so long as it is a main-chain benzoxazine comprising a polymer main chain having an oxazine ring. In particular, the main-chain benzoxazine represented by Chemical Formula 1 or Chemical Formula 2 below is preferably used in terms of reinforcing properties.

of Chemical Formula 2 has a double bond that may participate in the reaction upon rubber vulcanization, and thereby participates in the reaction with rubber upon sulfur cross-linking, thus increasing rubber hardness and mechanical properties.

The main-chain benzoxazine is prepared by reacting a diphenol-based compound, an amine-based compound, and an aldehyde-based compound.

The main-chain benzoxazine of the present invention is a main-chain type having a diphenol (two —OH groups) and a diamine (two —$NH_2$ groups), unlike monomer-type benzoxazine having a monophenol (one —OH group) and a monoamine (one —$NH_2$ group).

The diphenol-based compound may include, but is not limited to, bisphenol A (2,2-bis(4-hydroxyphenyl)propane, BPA), bisphenol AP (1,1-bis(4-hydroxyphenyl)-1-phenyl-ethane), bisphenol AF (2,2-bis(4-hydroxyphenyl)hexafluoropropane), bisphenol B (2,2-bis(4-hydroxyphenyl)butane), bisphenol BP (bis-(4-hydroxyphenyl)diphenylmethane), bisphenol C (2,2-bis(3-methyl-4-hydroxyphenyl)propane), bisphenol C (bis(4-hydroxyphenyl)-2,2-dichloroethylene), bisphenol E (1,1-bis(4-hydroxyphenyl)ethane), bisphenol F (bis(4-hydroxyphenyl)methane), bisphenol G (2,2-bis(4-hydroxy-3-isopropyl-phenyl)propane), bisphenol M (1,3-bis (2-(4-hydroxyphenyl)-2-propyl)benzene), bisphenol S (bis (4-hydroxyphenyl)sulfone), bisphenol P (1,4-bis(2-(4-hydroxyphenyl)-2-propyl)benzene), bisphenol PH (5,5'-(1-

<Chemical Formula 1>

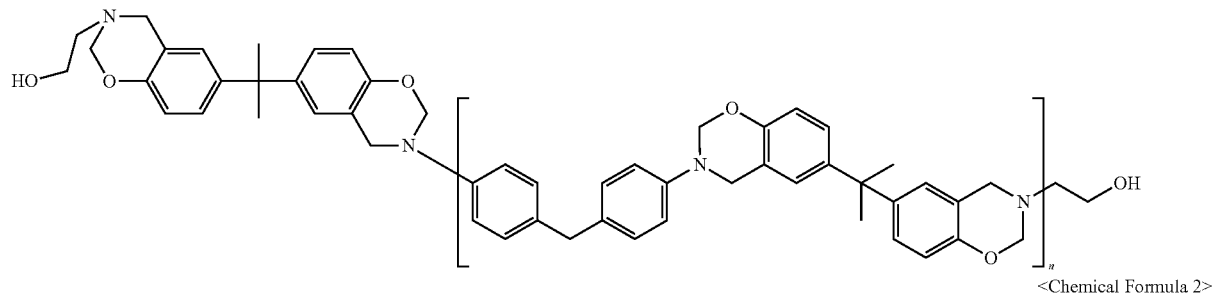

<Chemical Formula 2>

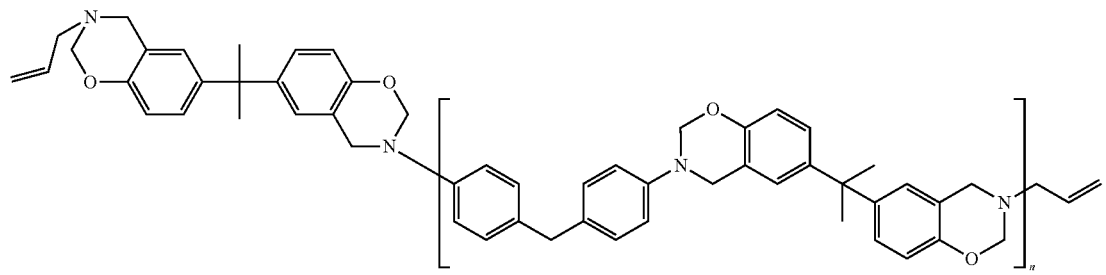

In Chemical Formula 1, n=1~10, and in Chemical Formula 2, n=1~10.

When the main-chain benzoxazine is contained in the rubber composition, no byproducts are generated upon vulcanization compared to conventional phenol novolac resin.

Furthermore, unlike conventional monomer-type benzoxazine, the benzoxazine of the present invention includes main-chain benzoxazine. In particular, the benzoxazine of Chemical Formula 1 is able to greatly improve the reactivity of conventional benzoxazine due to the presence of a hydroxyl group in the structure thereof, and enables rapid polymerization under given temperature conditions, thus exhibiting superior mechanical properties. The benzoxazine methylethyliden)-bis[1,1'-(bisphenyl)-2-ol]propane), bisphenol TMC (1,1-bis(4-hydroyphenyl)-3,3,5-trimethyl-cyclohexane), or bisphenol Z (1,1-bis(4-hydroxyphenyl)-cyclohexane). Of these, bisphenol A is preferably used in terms of economic benefits.

The amine-based compound is selected from among monoamine and diamine.

Specific examples of the monoamine may include ethanolamine, allylamine, methylamine, ethylamine, propylamine, butylamine, isopropylamine, hexylamine, octadecylamine, cyclohexylamine, 2-aminofluorene and aniline. Preferably, allylamine and ethanolamine are used in terms of reactivity and production feasibility.

Specifically, the diamine-based compound is selected from among diamino diphenyl methane, o-phenylene diamine, m-phenylene diamine, p-phenylene diamine, benzidine, furfurylamine, 1,4-diaminobenzene, 2-aminobenzylamine, 4,4'-methylenedianiline, 4,4'-diaminodiphenylether, 4,4'-diaminodiphenylsulfone, 4,4'-diaminophenylsulfide and 4,4'-oxydianiline; alicyclic diamine, including 1,4-diaminocyclohexane; and 1,2-diaminoethane, 1,3-diaminopropane, 1,4-diaminobutane, 1,6-diaminohexane, 1,10-diaminodecane, 1,12-diaminododecane, 1,14-diaminotetradecane and 1,18-diaminooctadecane. Preferably, diamino diphenyl methane, allylamine, and ethanolamine are used in terms of reactivity and production feasibility.

The aldehyde-based compound may include, but is not limited to, paraformaldehyde, formaldehyde, acetaldehyde, propionaldehyde, butylaldehyde, and polyoxymethylene. Preferably, paraformaldehyde is used in terms of productivity and economic benefits.

In the rubber composition of the present invention, the main-chain benzoxazine is contained in an amount of 1 to 30 parts by weight based on 100 parts by weight of raw rubber in order to increase the reinforcing properties thereof. If the amount of the main-chain benzoxazine is less than 1 part by weight, it is difficult to expect a noticeable increase in reinforcing properties. On the other hand, if the amount thereof exceeds 30 parts by weight, it is difficult to exhibit uniform properties owing to low dispersion efficiency.

The raw rubber may include 100 parts by weight of styrene-butadiene rubber and 10 to 60 parts by weight of natural rubber.

The rubber composition of the present invention may further include compounding agents typically useful in a rubber composition, such as zinc oxide, stearic acid, carbon black, processing oil, sulfur, and N-tert-butylbenzothiazole-2-sulfenamide (TBBS).

The compounding agents may be used in amounts suitable for desired purposes. For example, when zinc oxide is used, it may be contained in an amount of 1 to 10 parts by weight based on 100 parts by weight of the raw rubber. When the amount of zinc oxide falls in the above range, the activity of a crosslinking accelerator may increase, thus realizing effective crosslinking together with sulfur.

When stearic acid is used, it may be contained in an amount of 0.5 to 5 parts by weight based on 100 parts by weight of the raw rubber. When the amount of stearic acid falls in the above range, the activity of a vulcanization accelerator may increase together with zinc oxide.

When carbon black is used, it may be contained in an amount of 30 to 75 parts by weight, and preferably 50 to 65 parts by weight, based on 100 parts by weight of the raw rubber. Carbon black, useful as a reinforcing filler, is essential for rubber compounding. If the amount thereof is less than 30 parts by weight, reinforcing effects may decrease. On the other hand, if the amount thereof exceeds 75 parts by weight, dispersion becomes difficult.

When processing oil is used, it may be contained in an amount of 2 to 10 parts by weight based on 100 parts by weight of the raw rubber. When the amount of processing oil falls in the above range, processing flowability may increase and thus high dispersibility may result.

When sulfur is used, it may be contained in an amount of 0.5 to 25 parts by weight, and preferably 1 to 5 parts by weight, based on 100 parts by weight of the raw rubber. Taking into consideration the degree of curing optimal for desired properties, if the amount thereof is less than 0.5 parts by weight, a large amount of accelerator has to be used. On the other hand, if the amount thereof exceeds 25 parts by weight, overcuring may result.

When N-tert-butylbenzothiazole-2-sulfenamide (TBBS) is used as the crosslinking accelerator, it may be contained in an amount of 0.2 to 10 parts by weight, and preferably 0.5 to 2.5 parts by weight, based on 100 parts by weight of the raw rubber. Taking into consideration the crosslinking conditions and the sulfur content, if the amount thereof is less than 0.2 parts by weight, it cannot function as an accelerator. On the other hand, if the amount thereof exceeds 10 parts by weight, overcuring may result. Within the above range, the amount of sulfur that is used may be decreased.

As described above, according to the present invention, the diphenol-based compound, the amine-based compound, and the aldehyde-based compound are dissolved in an organic solvent, heated to 100~110° C., and subjected to azeotropic distillation so as to obtain a water content of 1% or less, thus yielding a main-chain benzoxazine, which is then added to the composition, resulting in a rubber composition.

MODE FOR INVENTION

A better understanding of the present invention may be obtained through the following examples, which are merely set forth to illustrate, but are not to be construed as limiting the scope of the present invention, as is apparent to those skilled in the art.

PREPARATION EXAMPLE 1. PREPARATION OF BENZOXAZINE (CHEMICAL FORMULA 1)

In a three-neck flask purged with nitrogen gas ($N_2$), 228.29 g (1 mol) of bisphenol A (2,2-bis(4-hydroxyphenyl) propane, BPA), 99.13 g (0.5 mol) of diamino diphenyl methane, and 120.12 g (4 mol) of paraformaldehyde were dissolved in 777 g of toluene, and then heated to 70° C. After completion of the heating, 61.08 g (1 mol) of ethanolamine was slowly added to the flask over 60 min.

Thereafter, the reaction solution was heated to 110° C. and then subjected to azeotropic distillation through dehydration to a water content of 1% or less using a Dean-Sturk trap (Aldrich).

After completion of the dehydration, vacuum degassing was performed to completely remove the reaction solvent used, thus yielding a polymer of Chemical Formula 1 having a weight average molecular weight (Mw) of 7937, corresponding to n=10 in the distribution.

PREPARATION EXAMPLE 2. PREPARATION OF BENZOXAZINE (CHEMICAL FORMULA 2)

In a three-neck flask purged with nitrogen gas ($N_2$), 228.29 g (1 mol) of bisphenol A (2,2-bis(4-hydroxyphenyl) propane, BPA), 99.13 g (0.5 mol) of diamino diphenyl methane, and 120.12 g (4 mol) of paraformaldehyde were dissolved in 777 g of toluene, and then heated to 70° C. After completion of the heating, 57.09 g (1 mol) of allylamine was slowly added to the flask over 60 min.

Thereafter, the reaction solution was heated to 110° C. and then subjected to azeotropic distillation through dehydration to a water content of 1% or less using a Dean-Sturk trap (Aldrich).

After completion of the dehydration, vacuum degassing was performed to completely remove the reaction solvent used, thus yielding a polymer of Chemical Formula 2 having a weight average molecular weight (Mw) of 3693, corresponding to n=8 in the distribution.

Figure 2:
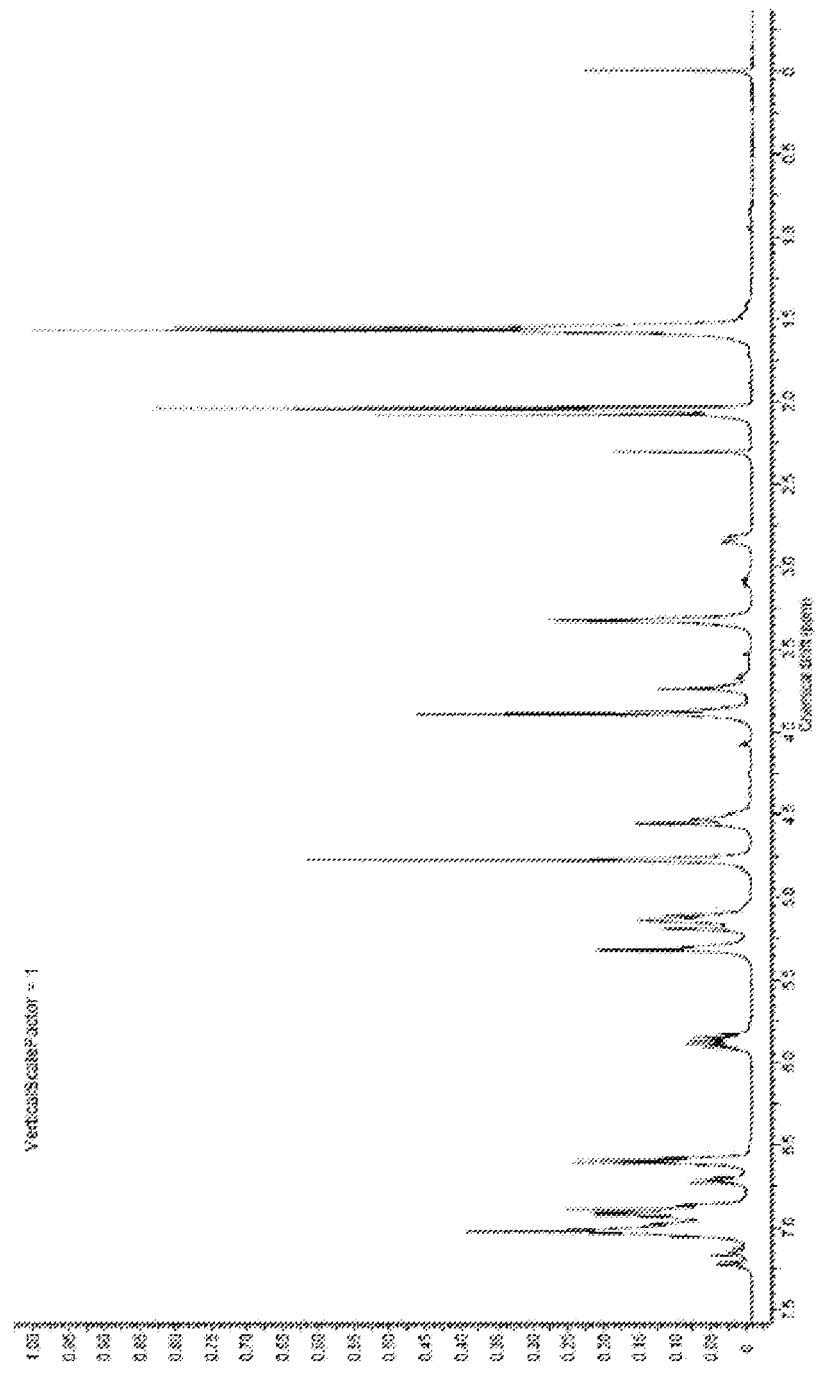
FIG. 2 shows the NMR spectrum of Chemical Formula 2, which is the main-chain benzoxazine of the present invention.

The NMR structures of the benzoxazines obtained in Preparation Examples 1 and 2 are shown in FIGS. 1 and 2 respectively. The molecular weight measurement was as follows.

<Molecular Weight Measurement>

A weight average molecular weight (Mw) and a number average molecular weight (Mn) were determined through gel permeation chromatography (GPC) (Waters: Waters707) using a polystyrene standard. The polymer to be measured was dissolved at a concentration of 4000 ppm in tetrahydrofuran and then injected in an amount of 100 μL into GPC. The mobile phase of GPC was tetrahydrofuran, which was introduced at a flow rate of 1.0 mL/min, and analysis was performed at 35° C. The four columns, Waters HR-05, 1, 2, 4E, were connected in series. Measurement was conducted using a RI and PAD Detector at 35° C.

EXAMPLE 1

A rubber test sample was manufactured by compounding 100 parts by weight of raw rubber comprising 100 parts by weight of styrene-butadiene rubber and 43 parts by weight of natural rubber, 3.0 parts by weight of zinc oxide, 1 part by weight of stearic acid, 60 parts by weight of carbon black, 5 parts by weight of processing oil, 2 parts by weight of sulfur, 1.5 parts by weight of TBBS (N-Tert-butylbenzothiazol-2-sulfenamide) and 10 parts by weight of a resin, namely benzoxazine of Chemical Formula 1 obtained in the Preparation Example, using a Banbury mixer, followed by curing at 160° C. for 20 min.

EXAMPLE 2

A rubber test sample was manufactured by compounding 100 parts by weight of raw rubber comprising 100 parts by weight of styrene-butadiene rubber and 43 parts by weight of natural rubber, 3.0 parts by weight of zinc oxide, 1 part by weight of stearic acid, 60 parts by weight of carbon black, 5 parts by weight of processing oil, 2 parts by weight of sulfur, 1.5 parts by weight of TBBS (N-Tert-butylbenzothiazol-2-sulfenamide) and 14.29 parts by weight of a resin, namely benzoxazine of Chemical Formula 2 obtained in the Preparation Example, using a Banbury mixer, followed by curing at 160° C. for 20 min.

EXAMPLE 3

The same composition as Example 1 was used, with the exception that the amount of benzoxazine was increased to 21.43 parts by weight.

EXAMPLE 4

The same composition as Example 2 was used, with the exception that the amount of benzoxazine was increased to 21.43 parts by weight.

COMPARATIVE EXAMPLE 1

A rubber test sample was manufactured by compounding 100 parts by weight of raw rubber comprising 100 parts by weight of styrene-butadiene rubber and 43 parts by weight of natural rubber, 3.0 parts by weight of zinc oxide, 1 part by weight of stearic acid, 60 parts by weight of carbon black, 5 parts by weight of processing oil, 2 parts by weight of sulfur, and 1.5 parts by weight of TBBS (N-Tert-butylbenzothiazol-2-sulfenamide) using a Banbury mixer, followed by curing at 160° C. for 20 min.

COMPARATIVE EXAMPLE 2

A rubber test sample was manufactured by compounding 100 parts by weight of raw rubber comprising 100 parts by weight of styrene-butadiene rubber and 43 parts by weight of natural rubber, 3.0 parts by weight of zinc oxide, 1 part by weight of stearic acid, 60 parts by weight of carbon black, 5 parts by weight of processing oil, 2 parts by weight of sulfur, 1.5 parts by weight of TBBS (N-Tert-butylbenzothiazol-2-sulfenamide) and 10 parts by weight of a phenol resin, namely KNR-1200 available from KOLON (15% relative to a hexamine resin) using a Banbury mixer, followed by curing at 160° C. for 20 min.

Evaluation of Properties (1) Tensile Measurement

The tensile stress-strain properties include tensile strength, elongation, and tensile stress. The standard methods for determining these properties are specified in ISO 37, ASTM D412, BS 903: Part A2, and DIN 53504. Test samples are dumbbell-type No. 1~4, mainly No. 3 (low elongation at No. 1, low tensile strength at No. 2, pure rubber compound and latex at No. 4), with a thickness of 2~3 mm. The tensile properties refer to tensile strength, elongation, and tensile stress. These properties are measured by stretching a standard sample at a predetermined speed in a device called a tensile tester.

The tensile strength is the force or stress at which a standard sample is stretched at a predetermined speed until breaking, and is represented by MPa, N/mm$^2$, kg/cm$^2$, and lb/cm$^2$. The tensile strength of different kinds of rubber varies from 7 MPa (71 kg/cm$^2$) to 45 MPa (451 kg/cm$^2$) depending on the raw rubber and the compounding agent.

The elongation or strain is defined as the length increase resulting from application of tensile force to the standard sample and is expressed as a percentage thereof relative to the initial length. For example, a 300% elongation means that the sample is elongated to a length four times the initial length. Ultimate elongation indicates the elongation at breakage, and is obtained automatically upon the tensile strength test. Ultimate elongation varies from 100% to 1000% depending on the kind of rubber compound, and usually indicates elongation or strain in the rubber test.

The tensile stress (or tensile modulus) applied to rubber is defined as the force required to maintain a predetermined elongation, and is represented by MPa, N/mm$^2$, kg/cm$^2$, and lb/cm$^2$, as in the tensile strength. The tensile stress (modulus) is mainly measured at 100% and 300% elongations. For example, when the force required for maintaining 100% elongation is 5 MPa (51 kg·f/cm$^2$), the 100% tensile stress is referred to as 5 MPa. The tensile stress designates the degree of hardness and the degree of vulcanization of the rubber compound, and is usually obtained during testing of the tensile strength. The 100% tensile stress of the rubber compound varies from 1 MPa (10.2 kg·f/cm$^2$) to 13 MPa (133 kg·f/cm$^2$) depending on the chemical composition of the rubber compound.

The test temperature has a great influence on the results. Hence, the temperature should be controlled and recorded in the measurement report. The standard laboratory temperature specified in ISO 37 is [20(±2)° C., 23(±2)° C., 27(±2)° C.]. The change in elongation speed has a great influence on the tensile stress and the elongation. As the elongation speed increases, tensile stress increases, elongation decreases, and tensile strength may increase or decrease.

The tensile test is useful for product management. In particular, tensile strength is affected by any change in the rubber compound caused by a manufacturing error. The tensile test is useful for measuring the resistance of rubber to aging caused by heat, liquid, gas, chemicals, ozone, climate, and the like. For this purpose, tensile strength, tensile stress, and elongation are measured before and after the exposure test. If the changes in these values are small, the service life is expected to be long.

Device Specifications and Conditions
Model: U.T.M.-Shimadzu AG-1S (Load cell: PFG-5kN)
Sample specification: Dumbbell-type No. 3
Test speed: 500 mm/min
Measurement DATA: Load (kgf), tensile strength (kgf), elongation (%), modulus (kgf, 50%, 100%, 300%)

Test Procedure
① Sample Preparation

As a sample, a rubber sheet that was crosslinked by pressing is relaxed for 24 hr or more and then cut so as to be adapted for the standard of dumbbell-type No. 3. Upon cutting, it is noted that when the sheet is formed at a predetermined thickness through open-rolling, the direction should be marked to induce cutting in a predetermined direction in order to reduce variation. The thickness of the cut sample is measured using a thickness meter and recorded.

② Program Setting

The test type (for tensile measurement), test conditions (test speed, physical properties to be calculated) are set and the elongation meter and the load value are calibrated. For the elongation meter, there is a need for calibration upon every measurement.

The elongation meter is essential for the elongation measurement in the case of a flexible material such as rubber, and if the load cell specification and the program set value do not match, the reliability of data may deteriorate and the test device may be impaired, and hence care must be taken.

③ Sample Attachment and Data Processing

The thickness value of each of the samples measured using a thickness meter is input, and each of the samples is fitted in the grips of the U.T.M. device. At this time, considering the position of the elongation meter, the elongation meter is located so that the elongation may fall in the measurement range of the sample.

Basically, in the case of tensile strength and modulus except for the load value and elongation, the thickness of the sample is applied, and thus, attention should be paid to thickness measurement. In the case where the fracture surface exceeds the measurement range after the test, it is marked and compared with data and the treatment thereof is then determined.

(2) Hardness Measurement

The hardness of rubber is defined as the degree to which the surface is resistant to indentation or penetration of a prescribed magnitude under a specified load. The hardness meter is categorized into several kinds according to the type of indentation and loading at the time of testing. It has a certain scale value that can directly read the value, and the scale is arbitrarily divided from 0 (very flexible) to 100 (rigid), and the load is applied in the form of a dead load or a spring.

The hardness is represented by IRHD (International Rubber Hardness Degrees) or Shore hardness degrees. The IRHD test is based on the principle of measuring the degree of penetration of a specified rigid ball into a sample under a predetermined dead load. The Shore hardness meter, called a Durometer, can be of a type A or a type D. The calibrated spring forces the specified indenter into the sample. The type A hardness meter has a dull cone indenter and is used to measure flexible rubber hardness up to about 90 Shore A. The type D hardness meter, having a pointed cone indenter and a spring different from that of the type A hardness meter, is used to measure the hardness of hard materials above 90 Shore A.

The Shore unit is almost the same as the IRHD unit, but should not be converted directly because large differences may occur. Most rubber products vary in hardness from 40 to 90 IRHD for practical use. A hardness of 40 or less may be obtained by adding a large amount of a plasticizer upon rubber compounding.

The sample having lower thickness is measured using a micro IRHD device (thumbnail of standard test). The thickness of a standard sample for micro testing is 2.0 (±0.2) mm. Given the above thickness range, it is often consistent with the results of a standard test method using the standard sample. A thicker or thinner sample may be used, but in any case it should be at least 1 mm thick. A measurement too close to the edge of the sample may contain an "edge effect". In conclusion, the minimum distance from the edge for a given thickness is set forth in ISO 48, 1400, 1818. The hardness test should be carried out at standard laboratory temperature [20(±2)° C., 23(±2)° C., 27(±2)° C.]. The test report should include (a) the dimensions of the sample, (b) the temperature, (c) the type of measuring surface (molding, polishing (buff), etc.), and (d) the type of test device used.

Apparent hardness is obtained through any test using a non-standard sample. Standard hardness is obtained through the testing using a standard sample (8 to 10 mm for standard test and 2.0 (±0.2) mm for micro test). Elastic products made from the same material may have different apparent hardness values depending on the shape and thickness thereof. The test results (e.g. O-rings) obtained from curved surfaces are arbitrary values that may be applied to a specific part, and may show a difference of 10 or more in IRHD.

Measurement Device
Model: Shore Hardness Tester (Shore-A type)
Sample size: Vulcanized rubber sheet thickness of 7 mm±0.5 mm Test Procedure
① Sample Preparation As a sample, a rubber sheet that was crosslinked by pressing is relaxed for 24 hr or more and then stacked in three layers to standardize the thickness. The hardness is affected by the thickness of the sample and should be at least 4 mm and a thickness in the range of 8 mm~10 mm is recommended.

② Measurement of Properties

Each of the portions of the crosslinked rubber sheet was measured five times and averaged. Upon measurement of properties, measurement of the edge of the crosslinked rubber sheet was avoided to prevent edge effects.

Results of Evaluation of Properties

The results measured as above are shown in Table 1 below.

TABLE 1

| | Tensile strength @50% | Tensile strength @100% | Tensile strength @300% | Fracture tensile strength | Fracture elongation | Hardness |
|---|---|---|---|---|---|---|
| Example 1 | 40.2 | 57.5 | 118.2 | 164.2 | 549.2 | 88.0 |
| Example 2 | 39.8 | 56.8 | 115.2 | 163.2 | 586.2 | 87.0 |
| Example 3 | 41.9 | 58.0 | 111.1 | 165.4 | 557.5 | 89.0 |
| Example 4 | 40.4 | 54.0 | 116.2 | 162.4 | 580.2 | 88.0 |

TABLE 1-continued

| | Tensile strength @50% | Tensile strength @100% | Tensile strength @300% | Fracture tensile strength | Fracture elongation | Hardness |
|---|---|---|---|---|---|---|
| Comparative Example 1 | 19.2 | 33.2 | 94.8 | 192.0 | 582.9 | 79.0 |
| Comparative Example 2 | 40.6 | 57.1 | 115.5 | 115.1 | 299.0 | 89.0 |

As is apparent from the above results, the rubber containing benzoxazine, manufactured by the method of the present invention, exhibited superior tensile strength and hardness to thus be evaluated as a material capable of realizing an improvement in reinforcing performance compared to Blank (Comparative Example 1), and also manifested tensile strength and hardness equal to or superior to the rubber using phenol resin (Comparative Example 2). In particular, fracture tensile strength and fracture elongation were outstanding.

According to the present invention, the rubber composition containing benzoxazine can be used in lieu of conventional phenol resin, and can exhibit superior tensile strength and fracture tensile strength and thus can be utilized in the tire industry. Thereby, the benzoxazine of the present invention generates no byproducts upon curing and can thus be utilized as a novel environmentally friendly rubber compound material.

Although specific embodiments of the present invention have been disclosed in detail as described above, it is obvious to those skilled in the art that such description is merely of preferable exemplary embodiments and is not construed to limit the scope of the present invention. Therefore, the substantial scope of the present invention will be defined by the appended claims and equivalents thereof.

INDUSTRIAL APPLICABILITY

The rubber composition of the present invention can be used for rubber products, especially tire products.

The invention claimed is:

1. A rubber composition comprising a raw rubber and a polymer comprising a benzoxazine ring in its main chain (main-chain benzoxazine).

2. The rubber composition of claim 1, wherein the main-chain benzoxazine has a weight average molecular weight of 500 g/mol to 10,000 g/mol.

3. The rubber composition of claim 1, wherein the main-chain benzoxazine is represented by Chemical Formula 1 or 2 below:

<Chemical Formula 1>

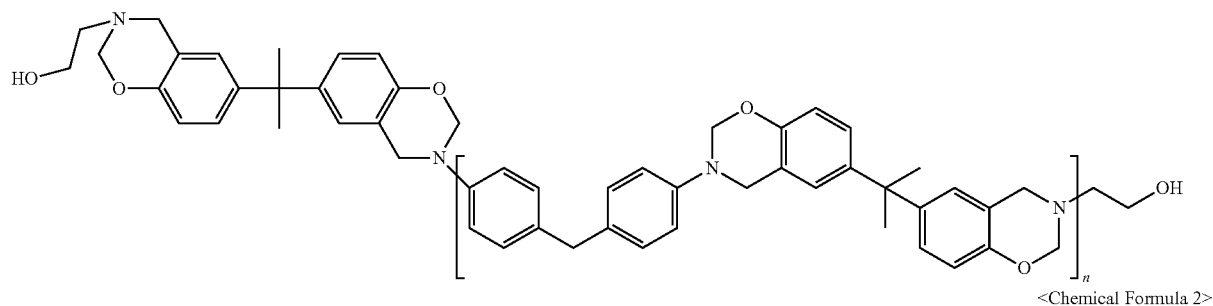

<Chemical Formula 2>

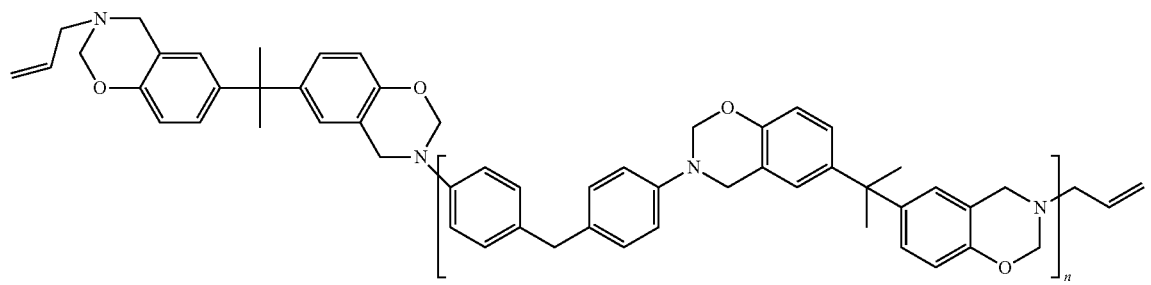

in Chemical Formula 1, n=1-10 and in Chemical Formula 2, n=1-10.

4. The rubber composition of claim 1, wherein the main-chain benzoxazine is prepared by reacting a diphenol compound, an amine compound, and an aldehyde compound.

5. The rubber composition of claim 4, wherein the diphenol compound is at least one selected from the group consisting of bisphenol A (2,2-bis(4-hydroxyphenyl)propane, BPA), bisphenol AP (1,1-bis(4-hydroxyphenyl)-1-phenyl-ethane), bisphenol AF (2,2-bis(4-hydroxyphenyl) hexafluoropropane), bisphenol B (2,2-bis(4-hydroxyphenyl) butane), bisphenol BP (bis-(4-hydroxyphenyl) diphenylmethane), bisphenol C (2,2-bis(3-methyl-4-hydroxyphenyl)propane), (bis(4-hydroxyphenyl)-2,2-dichloroethylene), bisphenol E (1,1-bis(4-hydroxyphenyl) ethane), bisphenol F (bis(4-hydroxyphenyl)methane), bisphenol G (2,2-bis(4-hydroxy-3-isopropyl-phenyl)propane), bisphenol M (1,3-bis(2-(4-hydroxyphenyl)-2-propyl) benzene), bisphenol S (bis(4-hydroxyphenyl)sulfone), bisphenol P (1,4-bis(2-(4-hydroxyphenyl)-2-propyl)benzene), bisphenol PH (5,5'-(1-methylethyliden)-bis[1,1'-(bisphenyl)-2-ol]propane), bisphenol TMC (1,1-bis(4-hydroxyphenyl)-3,3,5-trimethyl-cyclohexane), and bisphenol Z (1,1-bis (4-hydroxyphenyl)-cyclohexane).

6. The rubber composition of claim 4, wherein the amine compound is monoamine or diamine.

7. The rubber composition of claim 6, wherein the monoamine is at least one selected from the group consisting of ethanolamine, allylamine, methylamine, ethylamine, propylamine, butylamine, isopropylamine, hexylamine, octadecylamine, cyclohexylamine, 2-aminofluorene and aniline.

8. The rubber composition of claim 6, wherein the diamine is at least one selected from the group consisting of diamino diphenyl methane, o-phenylene diamine, m-phenylene diamine, p-phenylene diamine, benzidine, furfurylamine, 1,4-diaminobenzene, 2-aminobenzylamine, 4,4'-methylenedianiline, 4,4'-diaminodiphenylether, 4,4'-diaminodiphenylsulfone, 4,4'-diaminophenylsulfide and 4,4'-oxydianiline; alicyclic diamine, including 1,4-diaminocyclohexane; and 1,2-diaminoethane, 1,3-diaminopropane, 1,4-diaminobutane, 1,6-diaminohexane, 1,10-diaminodecane, 1,12-diaminododecane, 1,14-diaminotetradecane and 1,18-diaminooctadecane.

9. The rubber composition of claim 4, wherein the aldehyde compound is at least one selected from the group consisting of paraformaldehyde, formaldehyde, acetaldehyde, propionaldehyde, butylaldehyde and polyoxymethylene.

10. The rubber composition of claim 1, wherein the main-chain benzoxazine is contained in an amount of 1 to 30 parts by weight based on 100 parts by weight of raw rubber.

11. The rubber composition of claim 10, wherein the raw rubber comprises 100 parts by weight of styrene-butadiene rubber and 10 to 60 parts by weight of natural rubber.

12. The rubber composition of claim 1, wherein the rubber composition includes zinc oxide, stearic acid, carbon black, processing oil, sulfur, and N-tert-butylbenzothiazole-2-sulfenamide (TBBS).

13. The rubber composition of claim 12, wherein the rubber composition includes, based on 100 parts by weight of raw rubber, 1-10 parts by weight of zinc oxide, 0.5-5 parts by weight of stearic acid, 30-75 parts by weight of carbon black, 2-10 parts by weight of processing oil, 0.5-25 parts by weight of sulfur, and 0.2-10 parts by weight of N-tert-butylbenzothiazole-2-sulfenamide (TBBS).

* * * * *